United States Patent
Ayukawa

(10) Patent No.: US 6,264,578 B1
(45) Date of Patent: Jul. 24, 2001

(54) BELT TENSIONER WITH VIBRATION DAMPING FUNCTION

(75) Inventor: Kazumasa Ayukawa, Nara (JP)

(73) Assignee: Unitta Company, Osaka (JP)

( * ) Notice: Subject to any disclaimer, the term of this patent is extended or adjusted under 35 U.S.C. 154(b) by 0 days.

(21) Appl. No.: 09/339,298

(22) Filed: Jun. 24, 1999

(30) Foreign Application Priority Data

Jun. 26, 1998 (JP) .................................................. 10-180510

(51) Int. Cl.[7] ....................................................... F16H 7/12
(52) U.S. Cl. ............................................ 474/135; 474/109
(58) Field of Search ................................... 474/109, 133, 474/135, 138; 192/41 S, 81 C; 464/54, 57

(56) References Cited

U.S. PATENT DOCUMENTS

| 4,392,840 | * | 7/1983 | Radocaj | 474/117 |
|---|---|---|---|---|
| 4,473,362 | * | 9/1984 | Thomey et al. | 474/135 |
| 4,583,962 | | 4/1986 | Bytzek et al. | 474/133 |
| 4,822,322 | | 4/1989 | Martin | 474/135 |
| 5,470,280 | | 11/1995 | Ayukawa | 474/135 |
| 5,620,385 | * | 4/1997 | Cascionale et al. | 474/135 X |
| 5,803,849 | * | 9/1998 | Ayukawa | 474/135 X |

FOREIGN PATENT DOCUMENTS

| 3718227 | 12/1988 | (DE) . |
|---|---|---|
| 4010928 | 10/1991 | (DE) . |
| 19813586 | 9/1999 | (DE) . |
| 11-13843 | 1/1999 | (JP) . |

OTHER PUBLICATIONS

Patent Abstracts of Japan, vol. 1999, No. 4, JP 11 –13843 A published Apr. 30, 1999.

* cited by examiner

Primary Examiner—Richard M. Lorence
(74) Attorney, Agent, or Firm—Greenblum & Bernstein, P.L.C.

(57) ABSTRACT

The tensioner comprises a cup fixed to an engine block and a pivot shaft which is fixed to a bolt engagement portion of the cup. The pivot shaft is inserted into a pivot bearing, and an arm is pivotally attached to the pivot shaft. The arm is biased by a torsion coil spring to rotate in a direction tensioning the belt. A sleeve having an axially extending slit is attached to an outer surface of the bolt engagement portion. One end of a coil spring is wound around the pivot bearing, and the other end is wound around the sleeve. The coil spring and the sleeve minutely deform by the rotation of the arm to generate a damping force. A damping force acting upon the arm when tensioning the belt is smaller than the damping force acting upon the arm when the belt is loosened.

23 Claims, 13 Drawing Sheets

TORSION COIL SPRING

COIL SPRING (DIRECTION A)

COIL SPRING (DIRECTION B)

ENTIRE TENSIONER

BELT TENSIONER WITH VIBRATION DAMPING FUNCTION

BACKGROUND OF THE INVENTION

1. Field of the Invention

The present invention relates to a tensioner used for imparting a proper tension to a timing belt of an automotive engine or a belt for driving an auxiliary machine such as an alternator or compressor.

2. Description of the Related Art

Conventionally, the automatic tensioner is used in a transmission apparatus for transmitting a drive force of an engine to a plurality of devices by a single endless belt. The tensioner imparts a suitable tension to the belt and, at the same time, damps vibration of the belt generated due to fluctuation of the engine rotational speed or load. Thus, the drive force of the engine is reliably transmitted to the devices.

The tensioner is fixed to an engine block or in the vicinity thereof and is provided with, for example, a fixing member on which a cup is formed, an arm rotatably supported by a shaft so that it can freely rotate with respect to the cup, and a pulley attached to the front end of this arm. The arm is rotated, in a direction which presses the pulley against the belt, by a torsion coil spring provided substantially concentrically with respect to the center of rotation of the arm, by which a suitable tension is imparted to the belt. Further, as a damping mechanism for damping the vibration of the belt, a frictional member is provided between the arm and the cup. Due to this frictional member, a rotational resistance, i.e. damping force, is produced at the time of rotation of the arm, thus braking the rotation of the arm, and the vibration of the belt is damped.

In order for the pulley to constantly abut the belt and effectively damp the vibration of the belt, the arm is required to rotate relatively quickly in a direction in which the belt becomes tensioned and relatively slowly in a direction in which the belt becomes loosened. However, the above friction type damping mechanism is constituted so as to impart the same damping force in both directions, so the arm cannot rotate quickly in the direction tensioning the belt. As a damping mechanism for quickly tensioning the belt, for example, an oil pressure type damping mechanism in which an oil pressure cylinder is provided in place of the frictional member and a viscous resistance of oil is produced in only the direction in which the belt loosens is known.

However, the oil pressure type damping mechanism has a large number of parts and a complex structure in comparison with the friction type damping mechanism, therefore the cost becomes high. Further, the viscosity of the oil depends upon the environmental temperature, so the damping force is reduced in a high temperature region in comparison with that at room temperature, and the viscous resistance becomes high in a low temperature region and therefore the damping force is increased. Further, the direction of attachment is limited so as to prevent oil leakage, therefore the degree of freedom of design of the tensioner as a whole is lost and reduction of size becomes difficult.

SUMMARY OF THE INVENTION

Therefore, an object of the present invention is to provide a tensioner which reliably prevents occurrence of looseness of a belt for driving an auxiliary machine and effectively damps the vibration of the belt so as to be able to constantly hold the belt in the optimum tensioned state, while having a small size and simple structure.

According to the present invention, there is provided a tensioner comprising a fixing member, an arm, a biasing member, and a damping member.

The fixing member has a first boss. The arm has a second boss, coaxially arranged with respect to the first boss, and a pulley attached to an end portion of the arm. The arm is rotatable between a first rotation position and a second rotation position around the second boss. The biasing member urges the arm in a first direction from the second rotation position toward the first rotation position so as to tension a belt via the pulley. The damping member includes a coil spring having two end portions engaged with the first and second boss portions so as to connect the fixing member and the arm. The damping member generates a first damping force, which is a resistance against the rotation of the arm, and a second damping force larger than the first damping force so as to damp vibration of the belt. The first damping force acts upon the arm when the arm rotates in the first direction, and the second damping force acts upon the arm when the arm rotates in a second direction, which is the reverse of the first direction.

Further, according to the present invention, there is provided a tensioner comprising a first engaging portion and a second engaging portion, an arm, a biasing member and a damping member.

The first engaging portion and the second engaging portion are coaxially arranged with each other. The arm is provided with a pulley, which is engaged with an endless belt. The arm is rotatable between a first rotation position and a second rotation position around the first and second bosses. The biasing member urges the arm in a first direction from the second rotation position toward the first rotation position so as to tension the belt via the pulley. The damping member has a coil spring having two end portions engaged with the first and second engaging portions. The damping member generates a first damping force, which is a resistance against the rotation of the arm, and a second damping force larger than the first damping force so as to damp vibration of the belt. The first damping force acts upon the arm when the arm rotates in the first direction, and the second damping force acts upon the arm when the arm rotates in a second direction, which is the reverse of the first direction.

Still further, according to the present invention, there is provided a tensioner comprising a fixing member, an arm, a pulley, a biasing member and a spring type clutch.

The pulley is rotatably provided on the arm such that the pulley engages an endless belt. The biasing member urges the pulley into resilient contact with the belt, and a spring type clutch rotatably engages the arm to the fixing member. The spring type clutch includes a coil spring, that operates in conjunction with the biasing member to generate a first tightening force and a second tightening force larger than the first tightening force, and at least one of a first engaging member and a second engaging member engaged with the coil spring to produce a first rotational resistance that corresponds to the first tightening force and a second rotational resistance that corresponds to the second tightening force. The first rotational resistance occurs in a first rotational direction of the arm, and the second rotational resistance occurs in a second rotational direction which is opposite to the first rotational direction.

Further, according to the present invention, there is provided a tensioner comprising a pulley, an arm, a biasing member, a fixing member and a spring type clutch.

The pulley resiliently contacts an endless belt, and the arm rotatably engages the pulley on a first rotational axis. The biasing member urges the arm in a first direction so that the pulley tensions the belt. The fixing member rotatably engages the arm on a second rotational axis parallel to the first rotational axis, and a spring type clutch rotatably connects the arm and the fixing member. The spring type clutch, operating in conjunction with the biasing member, generates a first rotational resistance in the first direction and a second rotational resistance larger than the first rotational resistance in a second direction, which is opposite to the first direction.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
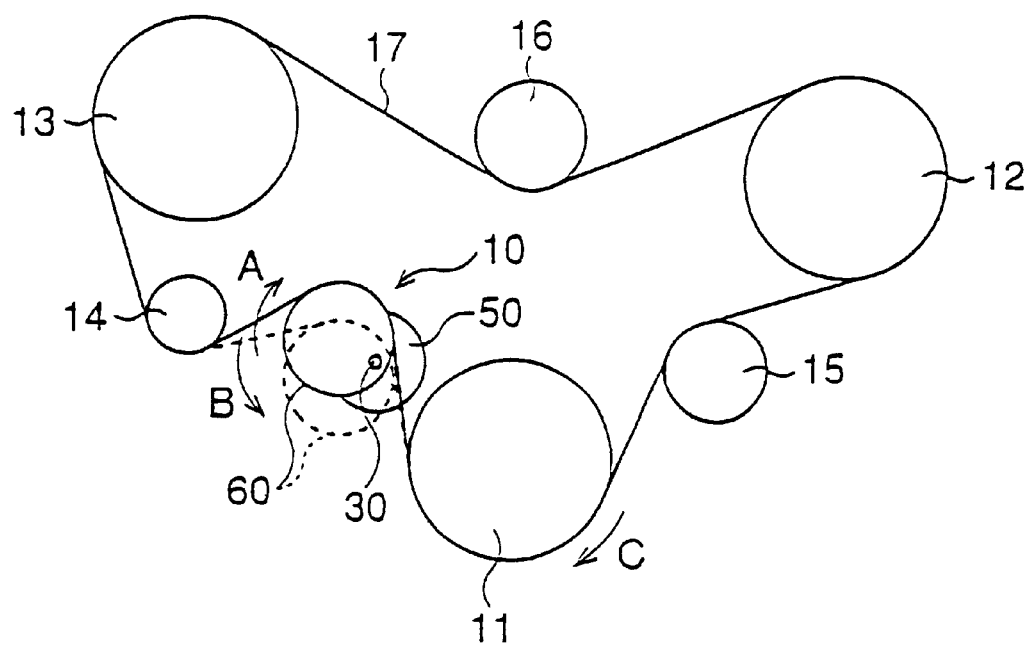
FIG. 1 is a view of a first embodiment of a tensioner according to the present invention showing a belt system of an automotive engine provided with the tensioner.

The present invention will be described below with reference to the embodiments shown in the drawings.

FIG. 1 is a view of a belt system of an automotive engine utilizing a tensioner of a first embodiment. A drive pulley 11 is attached to and rotated by an output shaft of the engine (not shown). Other than the drive pulley 11, this belt system is provided with an air conditioner (not shown), a power steering device (not shown), driven pulleys 12, 13, and 14 for an alternator (not shown), idle pulleys 15 and 16, and a tensioner 10. Around each pulley, an endless belt 17 is wound.

The belt 17 is driven in a clockwise direction (indicated by an arrow C) by the drive pulley 11. Consequently, other pulleys 12, 13, 14, 15, and 16 and the pulley 60 of the tensioner 10 are rotated.

A pivot shaft 30 is fixed to the engine block (not shown). The arm 50 can rotate around the pivot shaft 30. The pulley 60 is rotatably fixed to one end of the arm 50, and the belt 17 is wound around the outer circumferential surface of this pulley 60.

The pulley 60 is constantly biased in the clockwise direction (indicated by an arrow A) by a torsion coil spring (not shown), which tensions the belt 17 as indicated by a solid line position at the time of driving of the belt 17. When the belt 17 vibrates, the pulley 60 and the arm 50 rotate around the pivot shaft 30 following the belt 17. At this time, the arm 50 rotates relatively quickly in the direction indicated by the arrow A in which the pulley 60 tensions the belt 17 and rotates relatively slowly in the direction loosening the belt 17, that is, a counterclockwise direction (indicated by an arrow B).

When attaching the belt 17, a standard tool, such as a spanner or wrench, is used to rotate the pulley 60 in the direction indicated by the arrow B from the position of the solid line about the pivot shaft 30 against the biasing force in the direction indicated by the arrow A to make it retract to a position indicated by a broken line.

Figure 2:
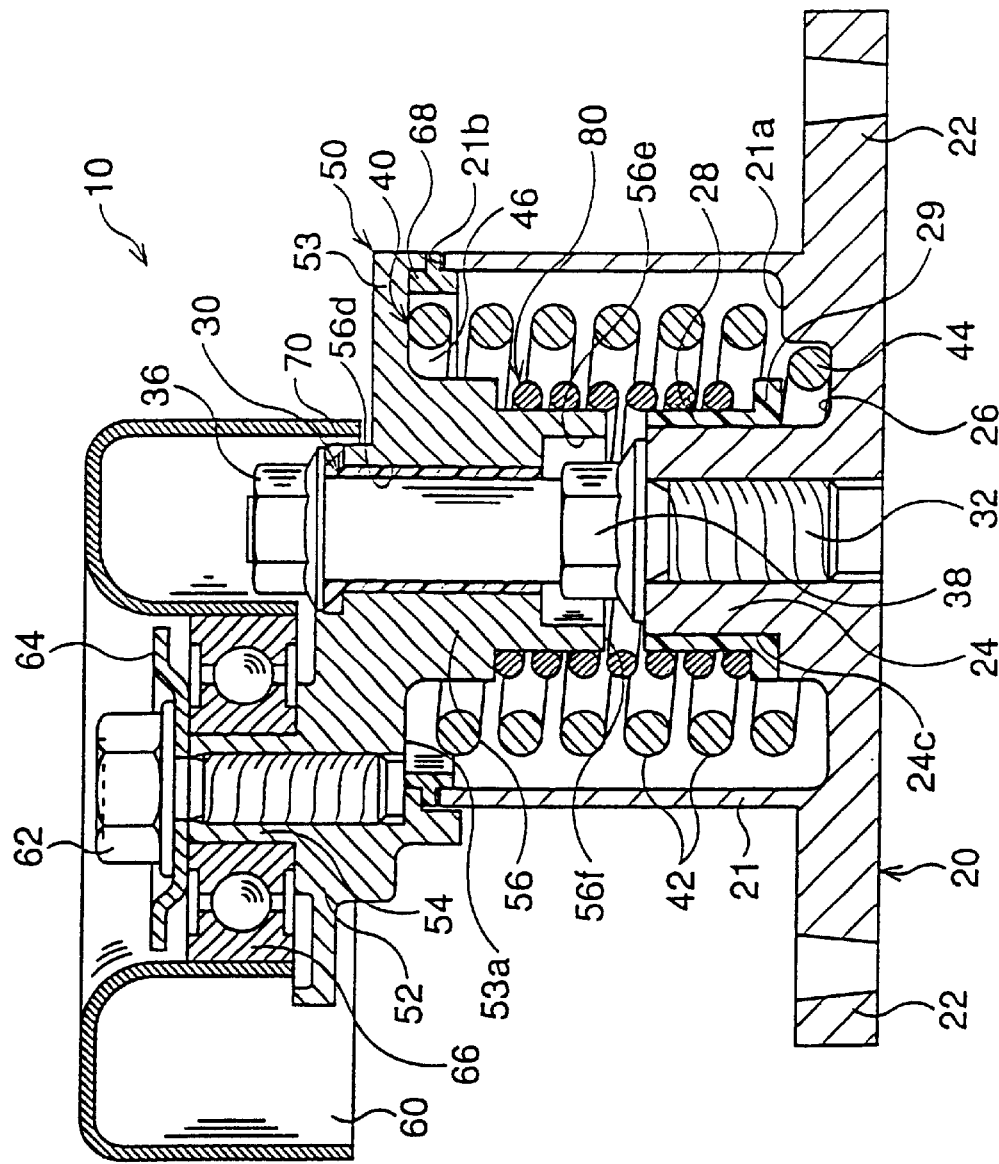
FIG. 2 is a vertical sectional view of the tensioner shown in FIG. 1.
Figure 3:
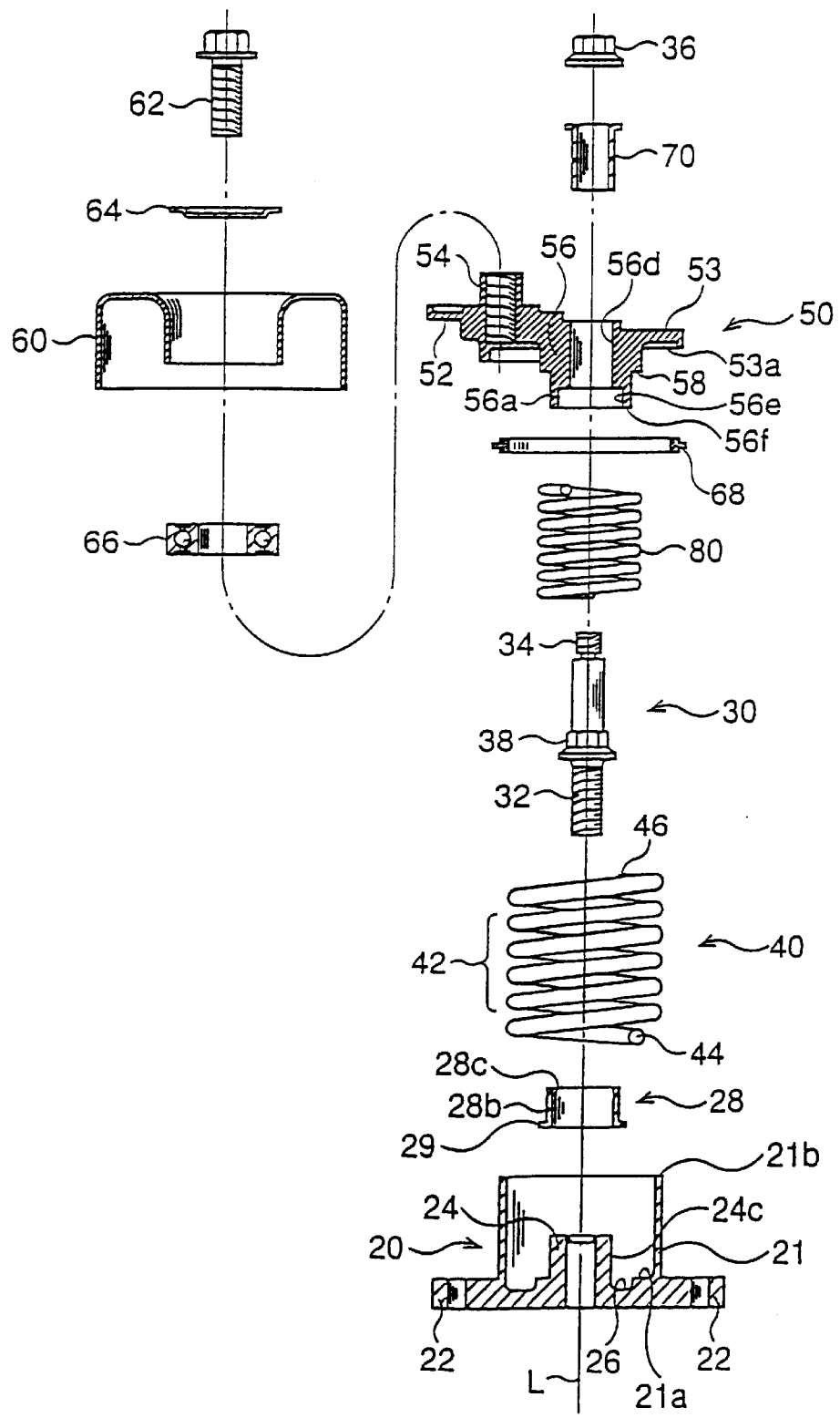
FIG. 3 is a sectional view of disassembled parts of the tensioner shown in FIG. 1.

With reference to FIGS. 2 and 3, the construction of the tensioner 10 will be explained. FIG. 2 is a sectional view of the tensioner 10, and FIG. 3 is a sectional view of disassembled parts of the tensioner 10.

The fixing member 20 is provided with a plate-like attachment portion 22 which may be attached to the engine block and a cylindrical cup 21 protruding from one surface of the attachment portion 22. A bolt engagement portion 24, which rises toward the interior of the cup 21, is formed at the center of a bottom surface 21a of the cup 21. The bolt engagement portion 24 and a screw portion 32 formed on a lower end of the pivot shaft 30 are screwed together, whereby the pivot shaft 30 is integrally fixed to the fixing member 20. A sleeve 28 with a flange 29 is attached to the bolt engagement portion 24. An inner surface 28c of the sleeve 28 is tightly fixed to an outer surface 24c of the bolt engagement portion 24. A groove portion 26, with which an end portion 44 of the torsion coil spring 40 is engaged, is formed on the cup bottom surface 21a.

The torsion coil spring 40 is formed of a metal wire having a constant diameter and has a spirally wound spiral portion 42 and two end portions 44 and 46 linearly extending from the spiral portion 42 toward the interior of the spiral in a plane perpendicular to a spiral axis (indicated by a one-dot chain line L in FIG. 3). The end portion 44 is engaged with a wall surface of the groove portion 26 of the cup 21. Another end portion 46 is engaged with a lower surface 53a of the arm 50. Both end portion 44 and end portion 46 engage an abutment surface (not shown) on the respective one of the groove portion 26 and lower surface 53a such that a torsional force will be provided.

The torsion coil spring 40, being suitably twisted, is interposed between the cup 21 and the arm 50 in a relatively lightly compressed state. Thus, the arm 50 and the pulley 60 are biased in a direction in which the torsion coil spring 40 returns from the twisted state, that is, in the direction indicated by the arrow A (FIG. 1).

The arm 50 is constituted by a pulley attachment portion 52 integrally connected to a lid portion 53 A cylindrical pulley bearing 54 is formed at the center of the pulley attachment portion S2. A ball bearing 66 is interposed between the pulley bearing 54 and the pulley 60. A bolt 62 is threadingly engaged with the pulley bearing 54, and the ball bearing 66 is fixed to the pulley attachment portion 52 by the bolt 62. A dust shield 64 is provided between a head of the bolt 62 and the ball bearing 66, so that intrusion of external particulate matter into the ball bearing 66 is prevented.

The lid portion 53 is a disk member having substantially the same radius as that of a cup opening 21b and is attached to the cup opening 21b by the pivot shaft 30. An annular dust cover 68, molded from a resin, is interposed between the lid portion 53 and the cup opening 21b. The inside of the cup 21 is substantially sealed by the dust cover 68, so intrusion of dust and dirt into the cup 21 is prevented.

A cylindrical pivot bearing 56 is formed in the lid portion 53, while the pivot bearing 56 projects from a lower surface 53a into the cup 21. A bearing bushing 70 is press-fit into the pivot bearing 56, while the pivot shaft 30 is inserted into the bearing bushing 70. A male screw portion 34 and a female screw member 36 of the pivot shaft 30 are screwed together, and the lid portion 53, i.e. the arm 50, is fixed in the axial direction with respect to the cup 21. Note that the bearing bushing 70 and the pivot shaft 30 slide with a relatively small rotational resistance, and the arm 50 can freely rotate around the pivot shaft 30 with respect to the cup 21.

Two cylindrically-shaped inner surfaces 56d and 56e are formed in the pivot bearing 56. The bearing bushing 70 engages with the inner surface 56d. The inner surface 56e is provided adjacent to the inner surface 56d and has a larger inner diameter than that of the inner surface 56d. Further, a cup-side bottom surface 56f of the pivot bearing 56 is separated from the bolt engagement portion 24 and the sleeve 28 by a predetermined distance. Due to the above configuration, in a state in which the arm 50 is attached to the cup 21, interference between the pivot bearing 56 and a hexagonal portion 38 of the pivot shaft 30 is prevented.

A coil spring 80, formed by spirally coiling a metal wire having a constant diameter, is provided inside the torsion coil spring 40. The coil spring 80 is a "right hand" coil spring where the metal wire inclines toward the top right when the spiral axis is vertical. Note that the torsion coil spring 40 is also a "right hand" coil spring in the same way as the coil spring 80. The coil spring 80 is coiled with a constant curvature. The two ends of the coil spring 80 form arc shapes having the same curvature as the curvature of the coil spring 80. One end of the coil spring 80 is engaged with the pivot bearing 56 of the arm 50 by an amount of at least one turn, while the other end is engaged with the sleeve 28 attached to the bolt engagement portion 24 by an amount of at least one turn. Namely, the pivot bearing 56 and the sleeve 28 are connected by the coil spring 80. The two end surfaces of the coil spring 80 may be ground to planes perpendicular to the shaft so as to improve the closeness of fit with the pivot bearing 56 and the sleeve 28.

Figure 4:
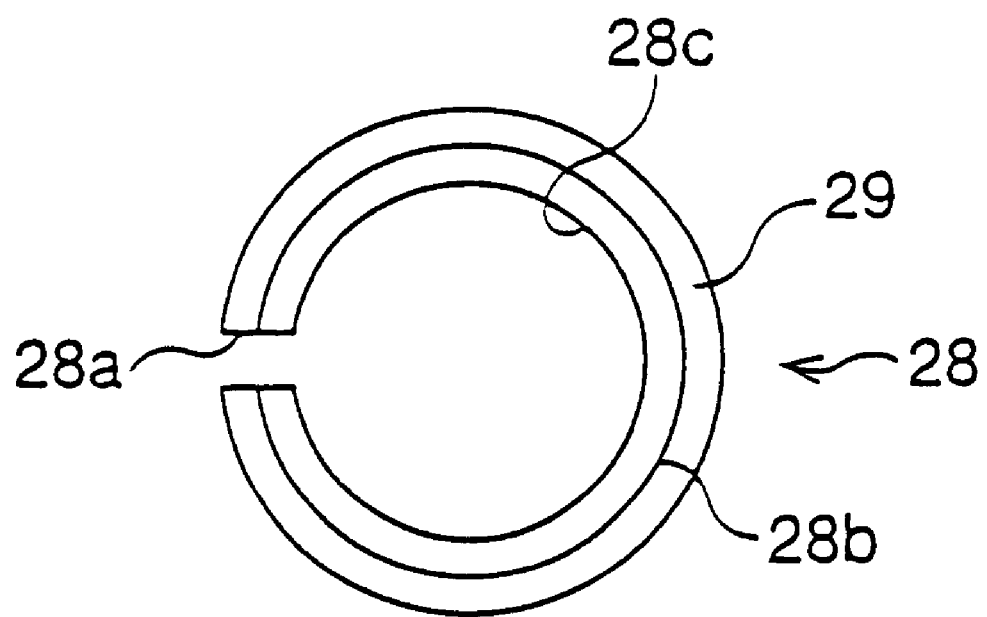
FIG. 4 is a top view of a sleeve of the tensioner shown in FIG. 1.

FIG. 4 is a top view of the sleeve 28. The sleeve 28 is an annular member provided with the flange 29 on a lower end. The sleeve 28 is molded from a material having only marginal susceptibility to heat deformation and being excellent in abrasion resistance, for example, a resin mainly comprised of a polyether sulfone, a plastic such as nylon, or an alloy such as that of an oil-filled bearing.

A slit 28a is formed in a side surface of the sleeve 28, so that the sleeve 28 exhibits a C-shape when seen from the axial direction. Due to the slit 28a, deformation and bending of the sleeve 28 at the time of heat deformation, assembly, or fastening of the coil spring 80 are absorbed. An outer diameter of the sleeve 28 is substantially equal to the inner diameter of the coil spring 80, but minor deformation in the circumferential direction is possible by the slit 28a. The coil spring 80 and the sleeve 28 act as the "coil spring clutch" as will be explained below.

Figure 5:
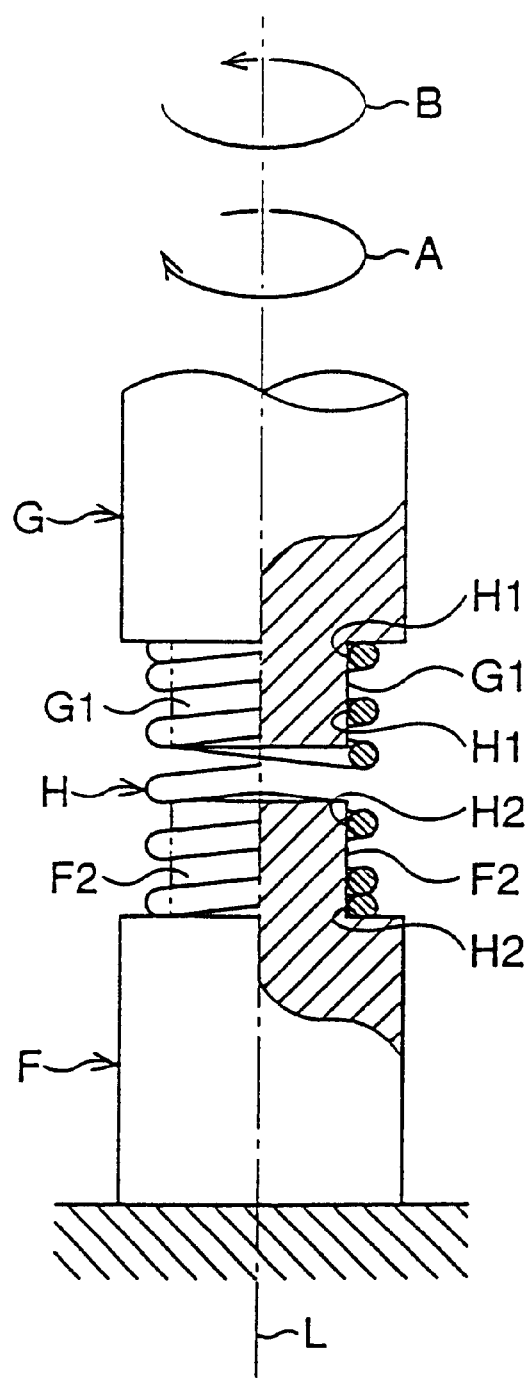
FIG. 5 is a view of a principle of a coil spring.

With reference to FIG. 5, a principle and mode of operation of the "coil spring clutch" will be described. FIG. 5 is a view of a structure in which two shafts F and G are connected by a right hand coil spring H. Part is shown cut away. A fixed shaft F is fixed with respect to an axial center L direction and the circumferential direction. A drive shaft G is arranged at a position separated from the fixed shaft F by exactly a predetermined distance in the axial center L direction and can freely rotate around the axial center L.

The right hand coil spring H is given a pre-pressure and is engaged with and fixed to the fixed shaft F and the drive shaft G. Namely, the right hand coil spring H is tightly fixed to an outer surface G1 of the drive shaft G at an upper end inner surface H1 and to an outer surface F2 of the fixed shaft F at a lower end inner surface H2, the right hand coil spring H exerting a predetermined pressing force on the drive shaft G and the fixed shaft F. The fixed shaft F and the drive shaft G are connected by only the right hand coil spring H.

When the drive shaft G is rotated in the direction indicated by the arrow A, the right hand coil spring H slightly deforms in a direction in which the diameter thereof becomes larger. Due to this deformation, the pressing force of the right hand coil spring H to the outer surface F2 is reduced, and the right hand coil spring H slides with respect to the fixed shaft F. Namely, the drive shaft G and the right hand coil spring H integrally rotate in the direction indicated by the arrow A relative to the fixed shaft F.

Conversely, when the drive shaft G is rotated in the direction indicated by the arrow B, the right hand coil spring H slightly deforms in a direction in which the diameter thereof becomes smaller. The drive shaft G1 is rotated in the direction indicated by the arrow B by exactly this amount of deformation. However, when the drive shaft G is further rotated, the pressing force of the right hand coil spring H against the outer surface G1 and the outer surface F2 is increased. Accordingly, the right hand coil spring H is increasingly tightened to the outer surface G1 of the drive shaft G on the upper end inner surface H1 and increasingly tightened to the outer surface F2 of the fixed shaft F on the lower end inner surface H2. Namely, the fixed shaft F and the drive shaft G are integrally connected by the right hand coil spring H, and the drive shaft G can rotate by exactly the amount of deformation of the right hand coil spring H.

In this way, the right hand coil spring H permits the relative rotation of the drive shaft G in only the direction indicated by the arrow A. The drive shaft G cannot substantially rotate in the direction indicated by the arrow B. Where the winding direction of the coil spring is reversed, that is, in a case of a left hand coil spring, the direction of action becomes opposite, but a similar action is produced. Namely, when the right hand coil spring H is replaced by a left hand coil spring, the drive shaft G rotates relative to the fixed shaft F in the direction indicated by the arrow B, but cannot substantially rotate in the direction indicated by the arrow A. The damping mechanism of the first embodiment is constituted by using the principle of such a "coil spring clutch".

Figure 6:
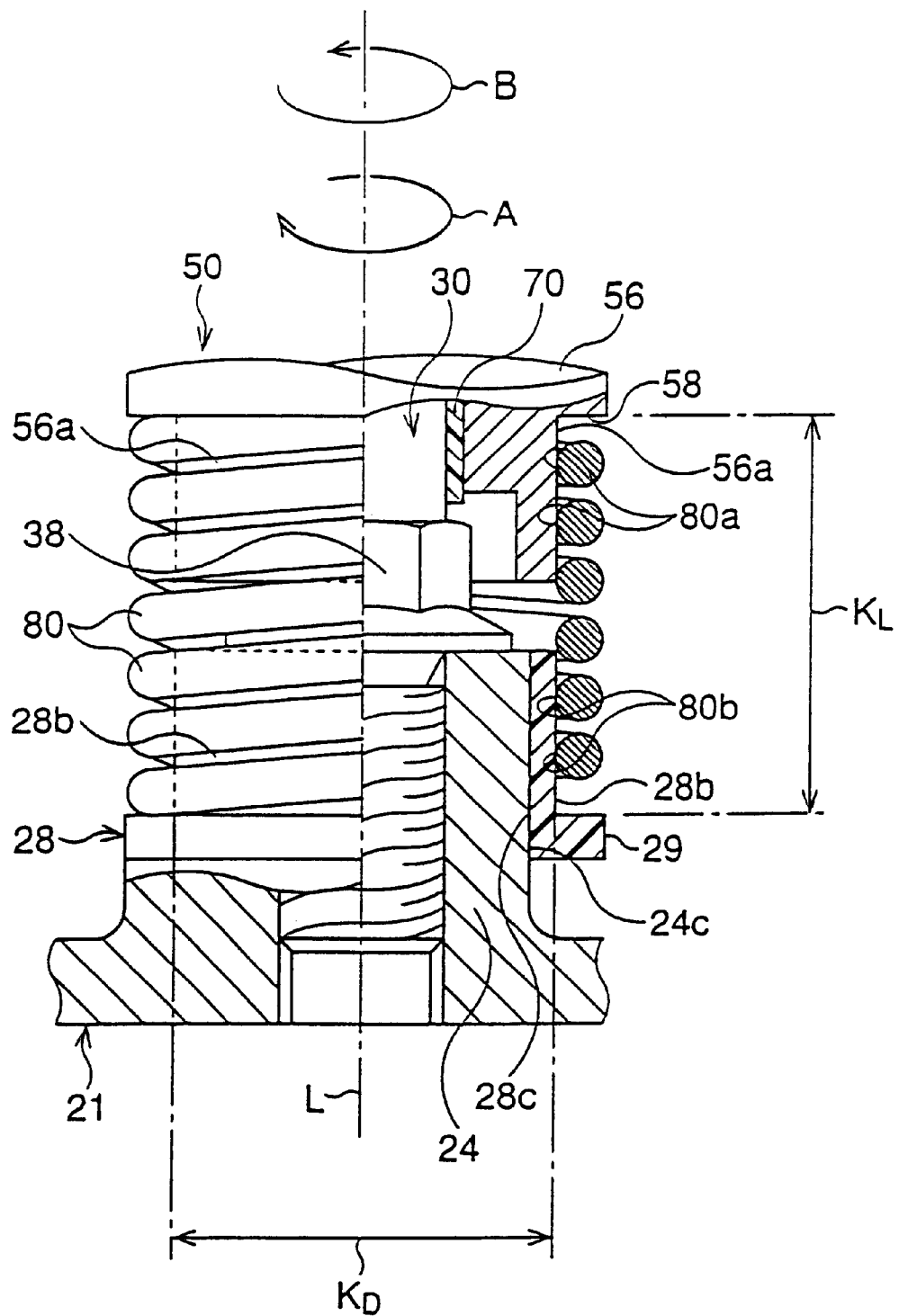
FIG. 6 is a partially sectional side view of a structural relationship among a cup, an arm and the coil spring of the tensioner shown in FIG. 1.

FIG. 6 is a partially sectional side view of a structural relationship between the cup 21, the arm 50 and the coil spring 80, which is part of the damping mechanism. The fixed shaft F, the drive shaft G, and the right hand coil spring H shown in FIG. 5 correspond to the bolt engagement portion 24 of the cup 21, the pivot bearing 56 of the arm 50, and the coil spring 80 shown in FIG. 6. The different part of the structure from that of FIG. 5 is the sleeve 28 interposed between the bolt engagement portion 24 and the coil spring 80.

When the pivot bearing 56 is rotated in the direction indicated by the arrow A, the coil spring 80 slightly deforms in the direction in which the diameter thereof becomes larger. Along with the deformation of the coil spring 80, the slit 28a is slightly enlarged in the circumferential direction by a restoration force of the sleeve 28, and the diameter of the sleeve 28 becomes slightly larger. Namely, due to the deformation of the coil spring 80 and the sleeve 28, the pressing force against the bolt engagement portion 24 by the sleeve 28 is reduced. Thus, the pivot bearing 56, i.e. the arm 50, is able to rotate with a relatively small rotational resistance $P_A$ in the direction indicated by the arrow A.

Conversely, when the pivot bearing 56 is rotated in the direction indicated by the arrow B, the coil spring 80 slightly deforms in the direction in which the diameter thereof becomes smaller, and the pivot bearing 56 rotates in the direction indicated by the arrow B by exactly this amount of deformation. However, when the pivot bearing 56 is further rotated, the pressing force of the coil spring 80 against the outer surface 56a of the pivot bearing 56 and the outer surface 28b of the sleeve 28 is increased. Accordingly, the coil spring 80 is tightly fixed to the outer surface 56a of the pivot bearing 56 at the inner surface 80a and tightly fixed to the outer surface 28b of the sleeve 28 at the inner surface 80b.

At this time, along with the deformation of the coil spring 80, the slit 28a of the sleeve 28 is slightly reduced in the circumferential direction, and the sleeve 28 deforms in the direction in which the diameter thereof becomes smaller. Accordingly, the pressing force of the coil spring 80 against the sleeve 28 or the pressing force against the bolt engagement portion 24 by the sleeve 28 is increased.

When the rotational drive force exceeds the frictional limit of the coil spring 80 and the sleeve 28 or the sleeve 28 and the bolt engagement portion 24, a rotational resistance $P_B$ larger than the rotational resistance $P_A$ between the sleeve 28 and the bolt engagement portion 24 is produced and sliding occurs. Accordingly, the pivot bearing 56, i.e. the arm 50, becomes able to rotate with a relatively large rotational resistance $P_B$ in the direction indicated by the arrow B.

When the sleeve 28 is not interposed, the pivot bearing 56 cannot rotate in the direction indicated by the arrow B due to the action of the coil spring 80 as mentioned above. However, by interposing the sleeve 28, when a load of the frictional limit or more acts upon the pivot bearing 56, rotation of the pivot bearing 56 in the direction indicated by the arrow B becomes possible. Thus, the arm 50 can be rotated up to the position at which the belt 17 is attached (position of broken line of FIG. 1). Further, at this time, a constant rotational resistance, which is a second frictional force, is produced between the coil spring 80 and the sleeve 28 or between the sleeve 28 and the bolt engagement portion 24. Thus, at the time of rotation of the arm 50 in the direction indicated by the arrow B, the constant rotational resistance or second damping force $P_B$ acts upon the arm 50.

The rotational resistance or first damping force $P_A$ is much smaller than the second damping force $P_B$, therefore the arm 50 can easily rotate in the direction indicated by the arrow A tensioning the belt 17, but cannot easily rotate in the direction indicated by the arrow B loosening the belt 17. Accordingly, by the tensioner 10, the belt 17 is quickly tensioned and becomes hard to loosen.

An axial direction length $K_L$ of the coil spring 80 is substantially equal to the distance from the spring receiving seat 58 of the pivot bearing 56 to the flange 29 of the sleeve 28. The axial direction position of the coil spring 80 is restricted by the spring receiving seat 58 and the flange 29. Further, the inner diameter $K_D$ of the coil spring 80 is substantially equal to the outer diameter of the pivot bearing 56 and the outer diameter of the sleeve 28.

Note that, in the first embodiment, the point at which sliding occurs between the coil spring 80 and the sleeve 28 and between the sleeve 28 and the bolt engagement portion 24 is suitably selected by the design criteria, for example, material and size, of the sleeve 28 and the coil spring 80, i.e. by increasing the number of turns of the engagement part of the coil spring 80, the rotational resistance can be increased, and so forth.

With reference to FIG. 7A–D, the mode of operation of the tensioner 10 of the first embodiment will be described below. There are mainly two load factors acting upon the belt 17 due to the tensioner 10: one is a repulsion force by the torsion coil spring 40, while the other is the damping force by the damping mechanism. These two biasing forces act to cause the belt 17 to be tensioned or loosened.

Figure 7A:
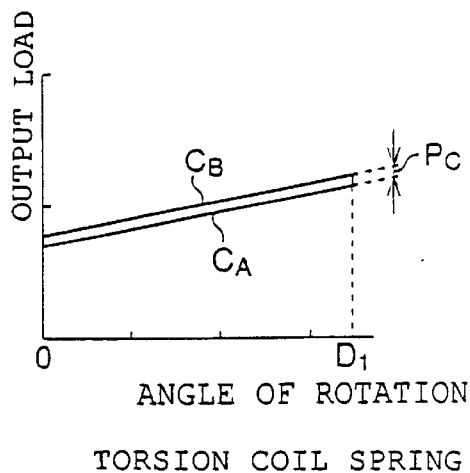
FIGS. 7A, 7B, 7C and 7D are graphs showing output characteristics of the tensioner shown in FIG. 1, a torsion coil spring, and the coil spring.

FIG. 7A is a graph showing an output characteristic of the tensioner 10 without the coil spring 80 and with only the torsion coil spring 40. In FIG. 7A, the angle of rotation from the predetermined initial position of the arm 50 is plotted on the abscissa, and the output load of the tensioner 10 is plotted on the ordinate.

The straight line $C_B$ indicates the relationship between the angle of rotation from the initial position and the output load in a case where the arm 50 is gradually rotated in the direction indicated by the arrow B up to an angle of rotation $D_1$. A straight line $C_A$ indicates the relationship between the angle of rotation from the initial position and the output load in a case where the arm 50 is rotated up to the angle of rotation $D_1$ and returns to the initial position along the direction indicated by the arrow A by the repulsion force of the torsion coil spring 40.

The output load generated by the torsion coil spring 40 is increased or decreased in proportion to the size of the angle of rotation of the arm 50, i.e. the torsion angle of the torsion coil spring 40. The output load contains the rotational resistance of the pivot shaft 30 and the bearing bushing 70. A hysteresis $P_C$ is produced with respect to a result of measurement using only the torsion coil spring 40. Note that the straight line $C_A$ and the straight line $C_B$ are substantially parallel. The inclinations coincide with the torsion spring constant of the torsion coil spring 40.

Figure 7B:
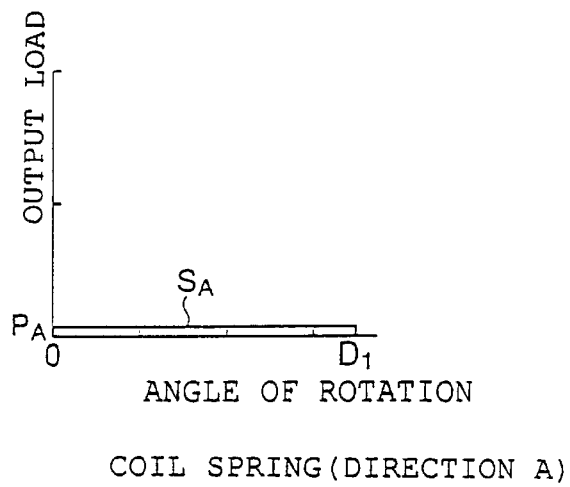
Figure 7C:
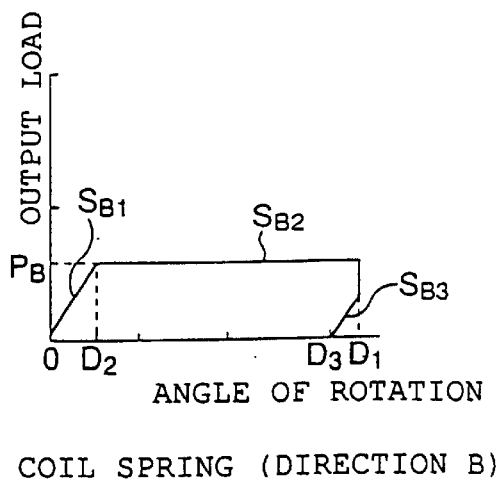

FIG. 7B and FIG. 7C are graphs indicating the output characteristic of the tensioner 10 provided with the coil spring 80 and the sleeve 28 while eliminating the torsion coil spring 40. In FIG. 7B, the ordinate indicates the output load of the tensioner 10, and the abscissa indicates the angle of rotation of the arm 50 along the direction indicated by the arrow A from the initial position. In FIG. 7C, the ordinate indicates the output load of the tensioner 10, and the abscissa indicates the angle of rotation of the arm 50 along the direction indicated by the arrow B from the initial position.

A straight line $S_A$ (shown in FIG. 7B) indicates that the arm 50 rotates in the direction indicated by the arrow A while producing the constant rotational resistance $P_A$. The rotational resistance $P_A$ is the first damping force acting when the arm 50 pivots in the direction indicated by the arrow A, i.e. when the pressing force of the coil spring 80 is reduced.

A straight line $S_{B1}$ (shown in FIG. 7C) indicates a state in which the arm 50 pivots up to a minute angle of rotation $D_2$ in the direction indicated by the arrow B and the output load is increased in proportion to the angle of rotation. The output load increasing in proportion to this angle of rotation is a third damping force which acts when the arm 50 pivots to the minute angle of rotation $D_2$ along the direction indicated by the arrow B, which loosens the belt 17.

A straight line $S_{B2}$ indicates that the arm 50 rotates in the direction indicated by the arrow B while producing the constant rotational resistance $P_B$ between the sleeve 28 and the bolt engagement portion 24 due to tightening of the sleeve 28 by the coil spring 80. The rotational resistance $P_B$ is the second damping force acting when the arm pivots in the direction indicated by the arrow B from the minute angle of rotation $D_2$.

A straight line $S_{B3}$ indicates that the arm 50, rotated up to the angle of rotation $D_1$, returns to an angle of rotation $D_3$ in the direction indicated by the arrow A by the reaction of the twisted coil spring 80.

According to the present invention, the minute angle of rotation $D_2$ is from about 3 degrees to about 5 degrees, the angle of rotation $D_1$ is about 40 degrees, and the angle of rotation $D_3$ is from about 33 degrees to about 37 degrees. However, these values are given as non-limiting examples.

As understood from FIG. 7C, the arm 50 rotates by a twisting of the coil spring 80 in a region from the initial position to the minute angle of rotation $D_2$ and rotates in the direction indicated by the arrow B due to the constant second damping force $P_B$ in a region of the minute angle of rotation $D_2$ or more. Further, the absolute value of the second damping force $P_B$ is a larger value than the absolute value of the first damping force $P_A$. From FIGS. 7B and 7C, it is shown that the arm 50 easily rotates in the direction indicated by the arrow A and does not easily rotate in the direction indicated by the arrow B.

Figure 7D:
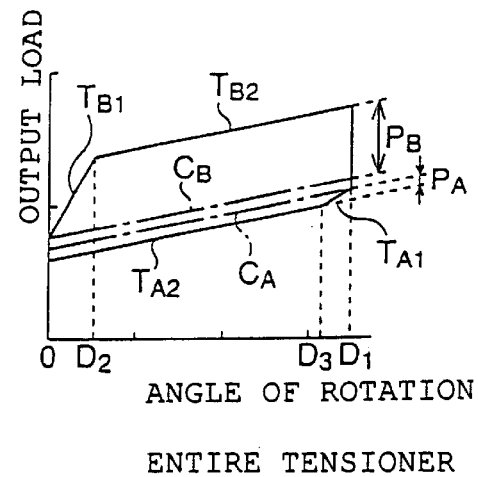

FIG. 7D is a view of the output characteristics of the tensioner 10 provided with both the torsion coil spring 40 and the coil spring 80. The abscissa indicates the angle of rotation of the arm 50, and the ordinate indicates the output load of the tensioner 10. The one-dot chain lines $C_B$ and $C_A$ are identical to the straight lines $C_B$ and $C_A$ of FIG. 7A. Straight lines $T_{B1}$ and $T_{B2}$ indicate the output load of the tensioner 10 when the arm 50 rotates in the direction indicated by the arrow B, and straight lines $T_{A1}$ and $T_{A2}$ indicate the output load of the tensioner 10 when the arm 50 rotates in the direction indicated by the arrow A.

The output load indicated by the straight line $T_{B1}$ substantially coincides with a value obtained by adding the output load of the torsion coil spring 40, indicated by the one dotted chain line $C_B$, and the output load of the coil spring 80, indicated by the straight line $S_{B1}$. It is shown that the third damping force, increased by twisting the coil spring 80 to the minute angle of rotation $D_2$, is imparted to the twisting force of the torsion coil spring 40.

The output load indicated by the straight line $T_{B2}$ substantially coincides with a value obtained by adding the output load of the torsion coil spring 40, indicated by the one dotted chain line $C_B$, and the output load of the coil spring 80, indicated by the straight line $S_{B2}$. It is shown that the constant rotational resistance $P_B$, produced when the coil spring 80 rotates from the minute angle of rotation $D_2$ to the angle of rotation $D_1$, is imparted as the second damping force to the twisting force of the torsion coil spring 40.

Regarding the output load indicated by the straight line $T_{A1}$, it is shown that a damping force, gradually increasing when the arm 50 returns from the angle of rotation $D_1$ to the angle of rotation $D_3$, acts against the twisting force of the torsion coil spring 40 by the reaction of the twisted coil spring 80.

The output load indicated by the straight line $T_{A2}$ substantially coincides with a value obtained by subtracting the output load of the coil spring 80, indicated by the straight line $S_A$, from the output load of the torsion coil spring 40, indicated by the one dotted chain line $C_A$. It is shown that the constant rotational resistance $P_A$, produced when the coil spring 80 rotates from the angle of rotation $D_3$ to the initial position, acts as the first damping force against the twisting force of the torsion coil spring 40.

As shown in FIG. 7D, when the arm 50 is pivoted from the initial position to the angle of rotation $D_1$, in the region from the minute angle of rotation $D_2$ to the angle of rotation $D_3$, the second damping force $P_B$ acts (straight line $T_{B2}$) when the arm 50 rotates in the direction indicated by the arrow B, while only the first damping force $P_A$ having an absolute value smaller than that of the second damping force $P_B$ acts (straight line T) when the arm 50 rotates in the direction indicated by the arrow A. Accordingly, the pulley 60 of the tensioner 10 moves relatively slowly in the direction indicated by the arrow B and moves relatively quickly in the direction indicated by the arrow A.

In this way, in the region from the minute angle of rotation $D_2$ to the angle of rotation $D_3$, i.e. where the fluctuation of the arm 50 is large, the large second damping force $P_B$ acts. Contrary to this, in the region from the initial position to the minute angle of rotation $D_2$, i.e. in the case where the fluctuation of the arm 50 is small, the third damping force acts on the arm 50 due to the spring characteristic of the coil spring 80, and the vibration is damped. Further, when the arm 50 returns in the direction indicated by the arrow A, after being rotated in the direction indicated by the arrow B up to the constant angle, which is, for example, the angle of rotation $D_1$, the repulsion force of the coil spring 80 acts as indicated by the straight line $T_{A1}$, therefore the pulley 60 can quickly return in the direction indicated by the arrow A.

Usually, a tensioner is designed so that the size of the minute angle of rotation $D_2$, and the size of the angle between the angle of rotation $D_1$ and the angle of rotation $D_3$ become minute, but the design can be changed so as to obtain an adequate angle of rotation in accordance with necessity.

Thus, the tensioner 10 of the first embodiment has a function equivalent to that of a tensioner provided with an oil pressure type damping mechanism of the prior art and can quickly tension the belt 17 by making the rotational resistance of the arm small in the direction tensioning the belt 17. Further, the damping mechanism has a simple structure by incorporating the coil spring 80 and the sleeve 28. The number of parts and the number of assembly steps are reduced in comparison with the oil pressure type damping mechanism of the prior art, so a reduction of costs and an improvement in durability become possible. Further, in contrast to the fact that the oil pressure type damping mechanism depends upon the ambient temperature, in the first embodiment, the frictional forces can be reliably maintained, particularly under high environmental temperatures, i.e. the reliability of the system is not dependent on the ambient temperature.

Further, in the case of the tensioner provided with the friction type damping mechanism of the prior art, the rotational resistance of the same load as that in the direction loosening the belt, i.e. the damping force, acts also in the direction tensioning the belt, therefore there arises the problem that when the damping force is set high, the belt cannot be quickly tensioned. In order to solve this problem, it is necessary to set the twisting force of the torsion coil spring high, but if the twisting force is set high, the belt tension inevitably also becomes higher, and there arises a problem of a reduction in the durability of the belt.

However, in the tensioner 10 of the first embodiment, the first damping force $P_A$ acting in the direction tensioning the belt is much smaller than the second damping force $P_B$ acting in the direction loosening the belt, therefore the problem inherent in the prior art, as discussed above, does not occur.

Figure 8:
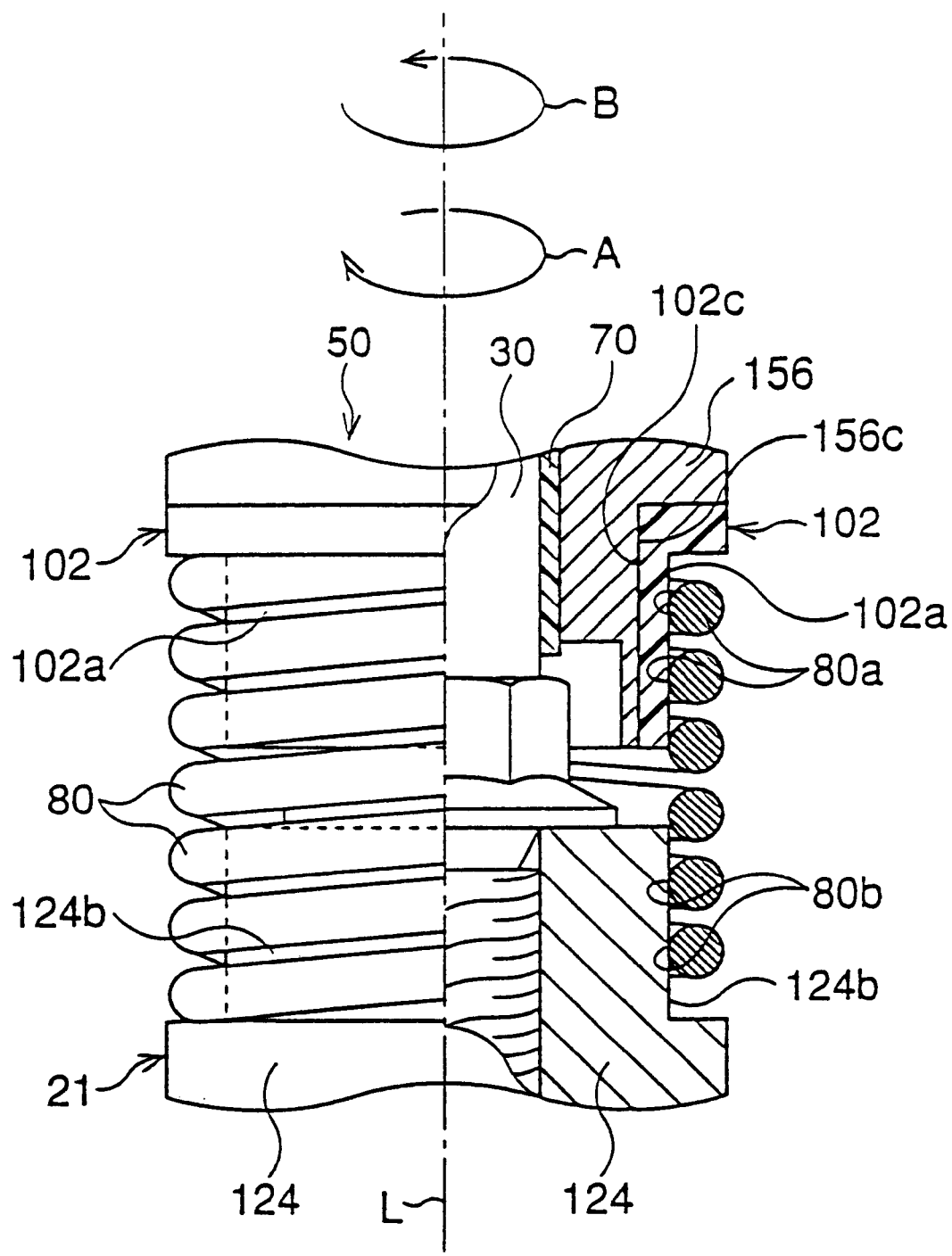
FIG. 8 is a partially sectional side view of a structure in the vicinity of the coil spring of the tensioner according to a second embodiment.

FIG. 8 shows another embodiment of the sleeve in a partially sectional side view of the tensioner. In the first embodiment, the sleeve 28 is provided around the bolt engagement portion 24, but in the second embodiment, a sleeve 102 is provided around a pivot bearing 156. In the second embodiment, the same reference numerals are given to the same structures as those of the first embodiment, and explanations thereof will be omitted.

A sleeve 102 provided with a flange on its upper end is provided around the pivot bearing 156. One end of the coil spring 80 is tightly fixed to an outer surface 102a of the sleeve 102 at an inner surface 80a, while the other end is tightly fixed to an outer surface 124b of a bolt engagement portion 124 at an inner surface 80b. The outer diameter of the bolt engagement portion 124 and the outer diameter of the sleeve 102 are substantially equal to the inner diameter of the coil spring 80.

When the arm 50 is rotated in the direction indicated by the arrow A, the coil spring 80 deforms in the direction in which the diameter thereof is enlarged, and an inner surface 102c of the sleeve 102 slides with respect to an outer surface 156c of the pivot bearing 156. Thus, the arm 50 rotates in the direction indicated by the arrow A relative to the cup 21, while producing a relatively small rotational resistance, i.e. damping force.

Conversely, when the arm 50 is rotated in the direction indicated by the arrow B, the coil spring 80 deforms in the direction in which the diameter thereof is reduced, and the inner surface 80a of the coil spring 80 slides with respect to the outer surface 102a of the sleeve 102 or the inner surface 102c of the sleeve 102 slides with respect to the outer surface 156c of the pivot bearing 156. Thus, the arm 50 rotates in the direction indicated by the arrow B relative to the cup 21, while producing a relatively large damping force.

According to the second embodiment, in the same way as the first embodiment, by provision of the damping mechanism provided with the coil spring and sleeve, the damping force produced in the direction in which the tensioner tensions the belt becomes small, and the tensioner can quickly tension the belt.

Figure 9:
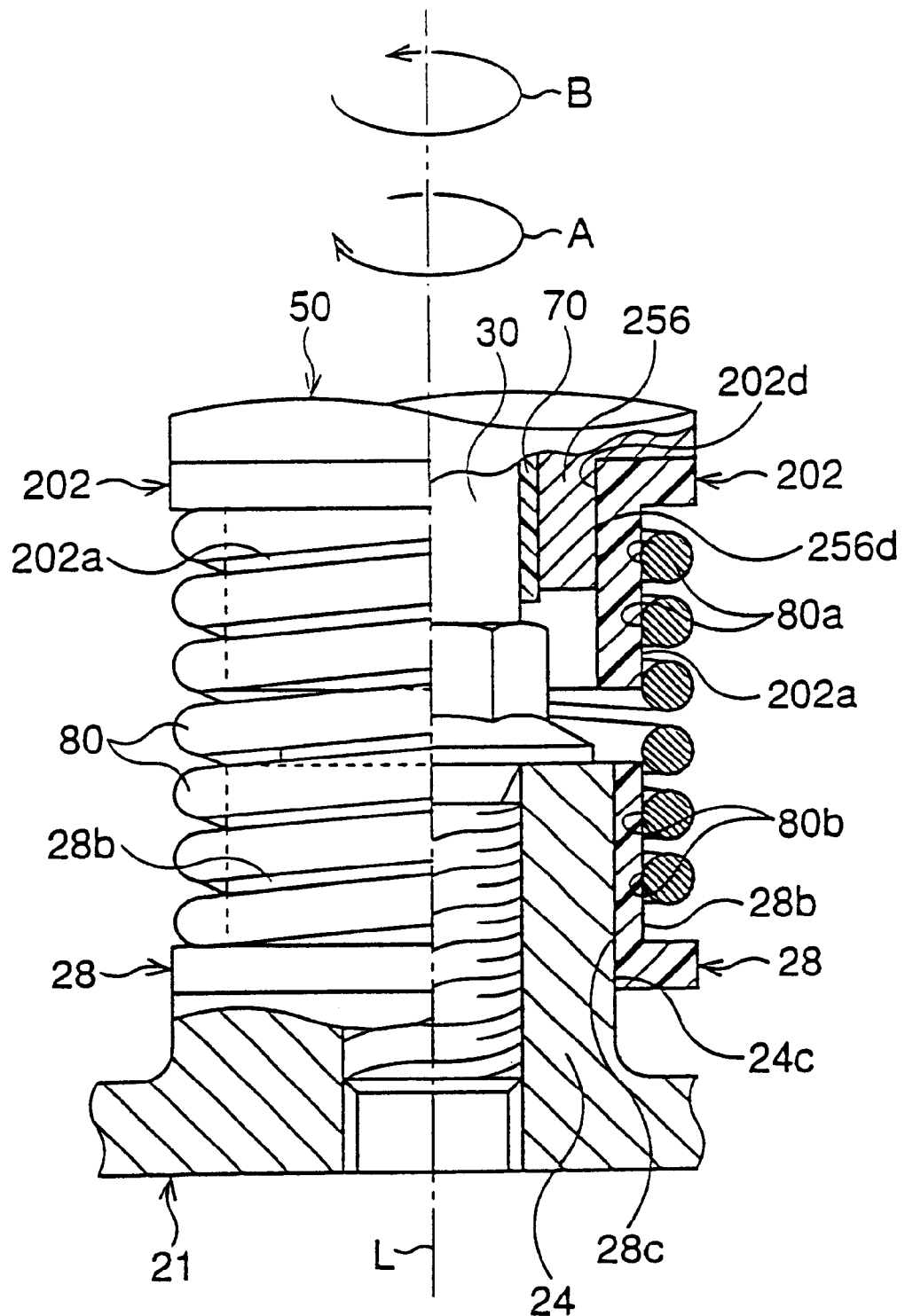
FIG. 9 is a partially sectional side view of the structure in the vicinity of the coil spring of the tensioner according to a third embodiment.

FIG. 9 is a partially sectional view of a third embodiment of the tensioner. In the first embodiment, the sleeve 28 is provided around the bolt engagement portion 24, but in the third embodiment, two sleeves 202 and 28 are provided around a pivot bearing 256 and the bolt engagement portion 24, respectively. In the third embodiment, the same reference numerals are given to the same structures as those of the first embodiment, and explanations thereof will be omitted.

In the third embodiment, a first sleeve 28 provided with a flange on its lower end is provided around the bolt engagement portion 24, and a second sleeve 202 provided with a flange on its upper end is provided around the pivot bearing 256. One end of the coil spring 80 is tightly fixed to an outer surface 202a of the second sleeve 202 at the inner surface 80a, while the other end is tightly fixed to an outer surface 28b of the first sleeve 28 at the inner surface 80b. The outer diameter of the first sleeve 28 and the outer diameter of the second sleeve 202 are substantially equal to the inner diameter of the coil spring 80.

The third embodiment comprises the same structure as the first embodiment apart from the newly provided structure consisting of the second sleeve 202. Due to the construction of the third embodiment, various requirements, which cannot be fulfilled by the first embodiment, for example, a request that the attachment force between the pivot bearing 56 and the coil spring 80 be strengthened, eased, or the like, can be handled. Further, by changing the material, the frictional coefficient and strength, a greater variety of design requests can be covered.

According to the third embodiment, in the same way as the first and second embodiments, due to provision of the damping mechanism provided with the coil spring and sleeve, the damping force produced in the direction in which the tensioner tensions the belt becomes small and the tensioner can quickly tension the belt.

Figure 10:
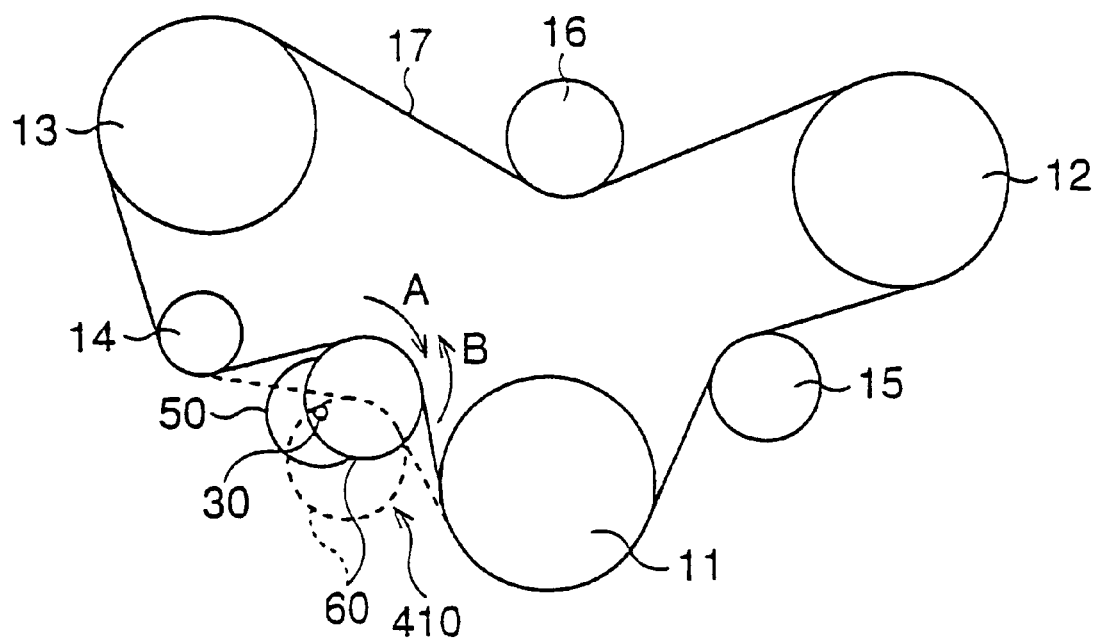
FIG. 10 is a view of the tensioner according to a fourth embodiment showing a belt system of the automotive engine provided with the tensioner.
Figure 11:
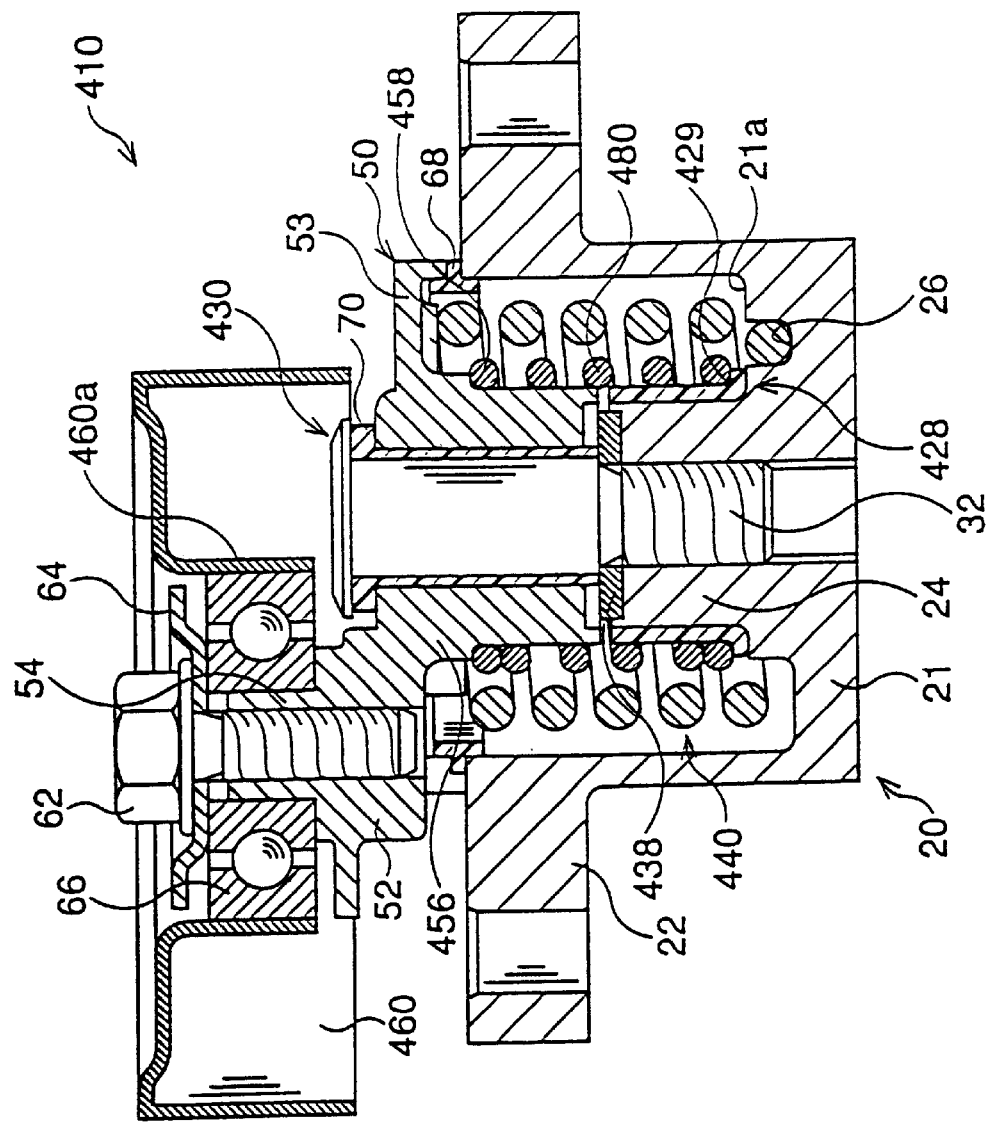
FIG. 11 is a vertical sectional view of the tensioner shown in FIG. 10.

FIGS. 10 and 11 show the tensioner of a fourth embodiment. The same reference numerals are given to the same structures as those of the first embodiment, and explanations thereof will be omitted.

FIG. 10 is a view of a belt system of an automotive engine utilizing a tensioner 410 as a fourth embodiment. The difference from the tensioner 10 of the first embodiment shown in FIG. 1 resides in an attachment position and a biasing direction. The tensioner 410 urges the belt 17 in the direction indicated by the arrow B. At the attachment of the belt 17, the arm 50 and the pulley 60 are biased in the direction indicated by the arrow A and retracted to the position indicated by the broken line.

FIG. 11 is vertical sectional view of the tensioner 410. In the first embodiment, the torsion coil spring 40 and the coil spring 80 were right hand coils, but a torsion coil spring 440 and a coil spring 480 of the fourth embodiment are left hand coils. Accordingly, the biasing direction of the belt 17 becomes the direction indicated by the arrow B, which is the opposite direction to the direction indicted by the arrow A of the first embodiment.

The difference in structure from the first embodiment lies in the shapes of a pivot shaft 430, a pulley bearing 456, and a sleeve 428 in addition to the torsion coil spring 440 and the coil spring 480. The pivot shaft is threadingly engaged with the bolt engagement portion 24 via a washer 438. The washer 438 has a short axial length in comparison with the hexagonal portion 38 of the first embodiment (see FIG. 2), therefore, the distance in the axial direction from the bolt engagement portion 24 to the pivot bearing 456 can be set shorter in comparison with the first embodiment.

Further, in the first embodiment, the female screw member 36 is disposed beyond the external surface of the lid portion 53, but resides within an area defined by the formation of the pulley 60, so that the female screw member 36 of the pulley shaft 30 does not interfere with the pulley 60. In the fourth embodiment, the head of the pivot shaft 430 is formed flat, therefore, the amount of projection from the lid portion 53 becomes small and does not interfere with an inner surface 460a of the pulley 460. Accordingly, the distance between the axes of the bolt 62 and the pivot shaft 430 can be decreased. Due to the above structure, a tensioner having a reduced size in comparison with the first embodiment is obtained.

A spring receiving seat 458 of the pivot bearing 456 is formed on a curved surface having substantially the same curvature as the curvature of the coil spring 480. Similarly, a shoulder portion 429 of the flange of the sleeve 428 is formed on a curved surface having substantially the same curvature as the curvature of the coil spring 480. Due to these constructions, the coil spring 480 is reliably engaged with the pivot bearing 456 and the sleeve 428 without having to grind the two end surfaces.

In the fourth embodiment, the arm 50 rotates relatively quickly while producing a relatively small rotational resistance, i.e. damping force, in the direction indicated by the arrow B for tensioning the belt, but rotates relatively slowly in the direction indicated by the arrow A for loosening the belt due to the relatively large damping force.

According to the fourth embodiment, in the same way as the first to third embodiments, by the provision of the damping mechanism provided with the coil spring and sleeve, the damping force produced in the direction in which the tensioner tensions the belt becomes small, and the belt can be quickly tensioned.

Figure 12:
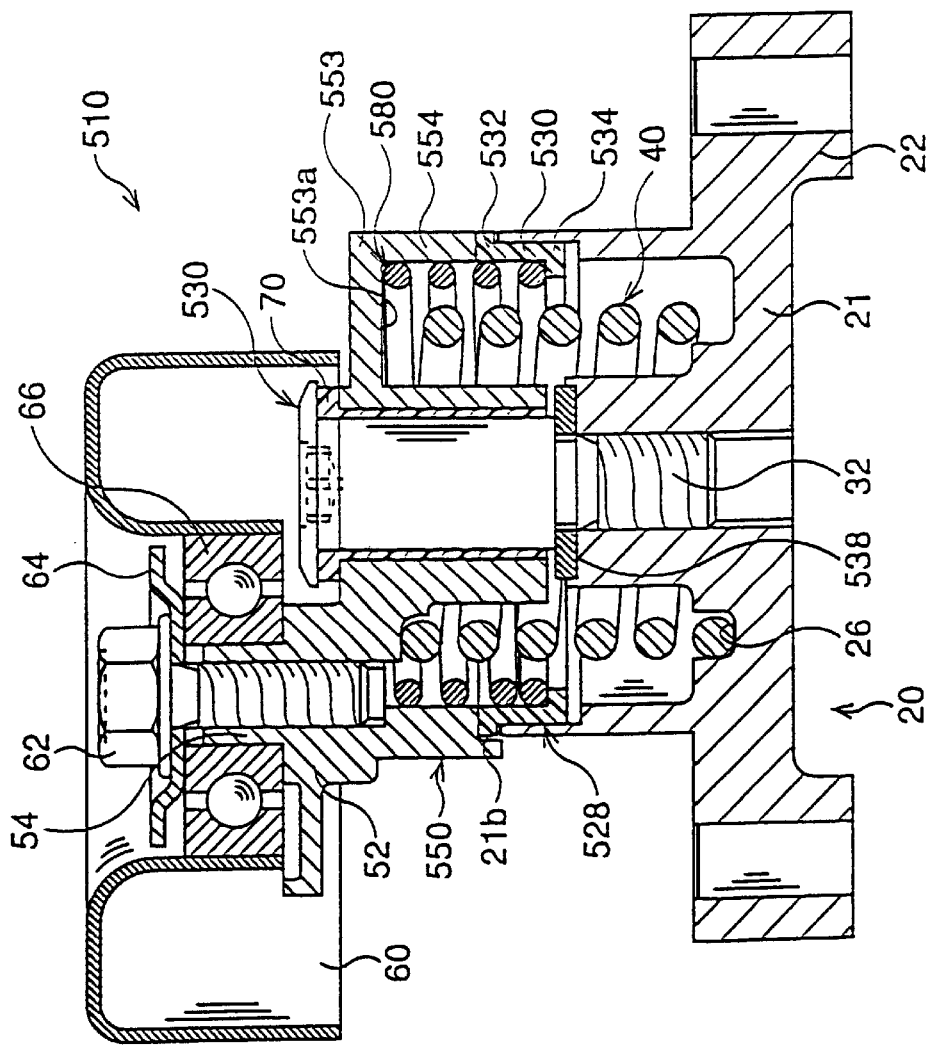
FIG. 12 is a vertical sectional view of the tensioner according to a fifth embodiment.

FIG. 12 shows the tensioner of a fifth embodiment. The same reference numerals are given to the same structures as those of the first embodiment, and explanations thereof will be omitted.

In a tensioner 510 of the fifth embodiment, a coil spring 580 is provided outside of a torsion coil spring 40. The torsion coil spring 40 is right hand coiled, but the coil spring 580 is left hand coiled. The arm 550 is provided with an outer circumferential wall 554 extending from the outer edge of a lid portion 553 to the cup 21. A sleeve 528 is provided between the outer circumferential wall 554 and the cup opening 21b. The sleeve 528 is provided with a cylindrical member 530, a first flange 532 extending from one end of the cylindrical member 530 in a direction away from the axial center, and a second flange 534 extending from the other end of the cylindrical member toward the axial center. The sleeve 528 has dual functions, being damping and, at the same time, preventing entry of dust into the cup 21.

Both of the inner diameter of the outer circumferential wall 554 of the arm 550 and the inner diameter of the cylindrical member 530 of the sleeve 528 are substantially the same as the outer diameter of the coil spring 580. Further, the distance from the lower surface 553a of the arm 550 to the second flange 534 is substantially the same as the axial length of the coil spring 580. The coil spring 580 is provided between a lower surface 553a of the lid portion and the second flange 534, and the outer surface thereof is tightly fixed to the inner surface of the outer circumferential wall 554 and the inner surface of the cylindrical member 530.

When the arm 50 rotates in the direction in which the torsion coil spring 40 is twisted, the coil spring 580 deforms in the direction in which the diameter thereof is enlarged, the cylindrical member 530 and the cup opening 21b are tightly fixed, and the coil spring 580 and the sleeve 528 slide. Namely, only the arm 550 and the coil spring 580 integrally rotate. Conversely, when the arm 550 rotates in the direction in which the torsion coil spring 40 returns from the twisted state, the coil spring 580 is compressed, and the cylindrical member 530 and the cup opening 21b slide. Namely, the arm 550, the coil spring 580 and the sleeve 528 integrally rotate.

Thus, if the sliding surface of the coil spring 580 with respect to the arm 550 and the cup 21 is provided at the outside, a relatively large rotational resistance is generated when the coil spring 580 expands, and the action becomes opposite to the action of the coil spring 80 of the first embodiment. Accordingly, by using the coil spring 580 wound in the opposite direction to the winding direction of the right hand torsion coil spring 40, i.e. left hand coiled, a similar effect to that of the first embodiment is obtained.

Where the rotational resistance is generated at the inner circumferential surface of the coil spring, as in the first to fourth embodiments, the twisting directions of the torsion coil spring and the coil spring are the same. Conversely, where the rotational resistance is generated at the outer circumferential surface of the coil spring as in the fifth embodiment, the twisting directions of the torsion coil spring and the coil spring become opposite to each other.

Also, in the fifth embodiment, in the same way as the first to fourth embodiments, by the provision of the damping mechanism provided with the coil spring and sleeve, the damping force produced in the direction in which the tensioner tensions the belt becomes small, and the belt can be quickly tensioned.

Figure 13:
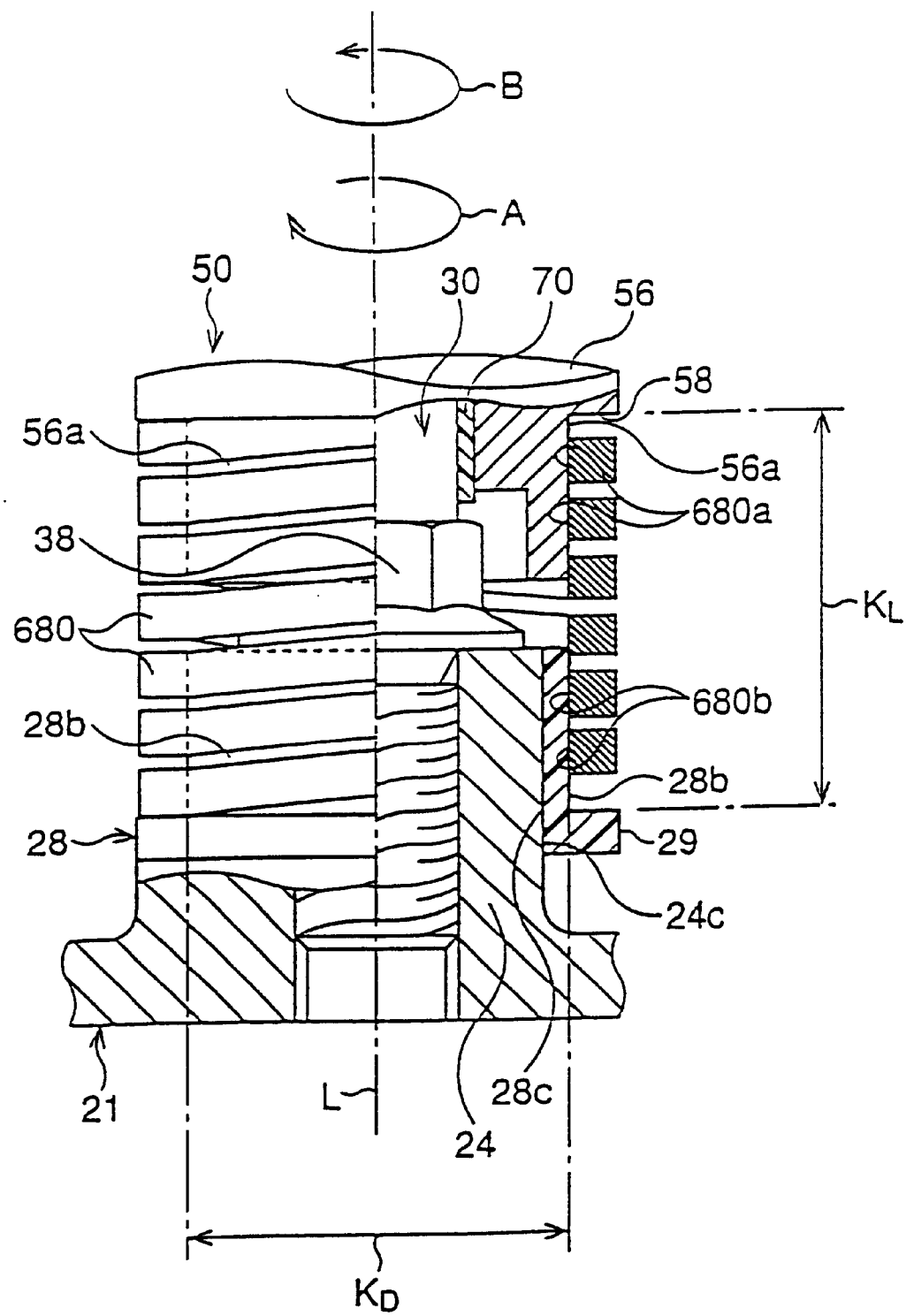
FIG. 13 is a partially sectional side view of the structure in the vicinity of the coil spring of the tensioner according to a sixth embodiment.

FIG. 13 is a partially sectional view of another embodiment of the coil spring housed in the tensioner. In the first embodiment, the sectional shape of the coil spring 80 was circular, but in the sixth embodiment, the sectional shape of the coil spring 680 is rectangular. In the sixth embodiment, the same reference numerals are given to the same structures as those of the first embodiment, and explanations thereof will be omitted.

In the sixth embodiment, an inner surface 680a of the coil spring 680 is tightly fixed to the outer surface 56a of the pivot bearing 56, and an inner surface 680b is tightly fixed to the outer surface 28b of the sleeve 28.

The mode of operation of the coil spring 680 is the same as that of the coil spring 80 indicated in the first embodiment, so the explanation will be omitted. Namely, in the sixth embodiment, in the same way as the first to fifth embodiments, the damping force produced in the direction tensioning the belt by the tensioner becomes small, whereby the belt can be quickly tensioned.

Further, the surface area of the coil spring 680 tightly fixed to the pivot bearing 56 and the sleeve 28 is large in comparison with that of the coil spring 80 of the first embodiment, so a larger rotational resistance can be generated by the same number of turns as that of the coil spring 80.

As described above, the automatic tensioner of the first to sixth embodiments is provided with the damping mechanism which freely displaces the arm in only one direction. Due to this damping mechanism, when the displacement of the arm is very small, a flexible spring characteristic of the coil spring acts, however, when the displacement of the arm is large and of an impact nature, a large damping force acts such that the vibration of the belt is effectively suppressed. Further, this damping mechanism does not depend upon the environmental temperature and can reliably induce a damping force, even at particularly high ambient temperatures.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 10-180510 (filed on Jun. 26, 1998) which is expressly incorporated herein, by reference, in its entirety.

What is claimed is:

1. A tensioner comprising:
a fixing member that includes a first boss;

an arm that includes a second boss, coaxially arranged with respect to said first boss, and a pulley attached to an end portion of said arm, said arm being rotatable between a first rotation position and a second rotation position around said second boss;

a biasing member that urges said arm in a first direction from said second rotation position toward said first rotation position so as to tension a belt via said pulley; and a damping member that includes a first coil spring having two end portions engaged with said first and second bosses so as to connect said fixing member and said arm, said damping member configured to generate a first damping force, which is a resistance against the rotation of said arm, and a second damping force larger than said first damping force so as to damp vibration of said belt;

said damping member further comprising at least one sleeve having at least one axially extending slit, said at least one sleeve provided between at least one of said first and second bosses and said first coil spring;

wherein said first damping force acts upon said arm when said arm rotates in said first direction, and said second damping force acts upon said arm when said arm rotates in a second direction, which is the reverse direction to said first direction; and wherein when said arm rotates from said first rotation position in said second direction, said first coil spring and said sleeve act as a coil spring clutch that brakes the rotation of said arm due to a frictional sliding movement at least one of between said first coil spring and said sleeve and between said sleeve and one of said first and second bosses.

2. A tensioner according to claim 1, wherein an absolute value of said first damping force is substantially 0.

3. A tensioner according to claim 1, wherein, when said arm rotates from said second rotation position in said first direction, in a predetermined range of rotation between said first rotation position and said second rotation position, a first frictional force produced by the rotation of said arm acts as said first damping force, and when said arm rotates from said first rotation position in said second rotation direction, a second frictional force larger than said first frictional force in the range of rotation and which is produced by the rotation of said arm acts as said second damping force.

4. A tensioner according to claim 3, wherein, in the range of rotation, the magnitudes of absolute values of said first frictional force and said second frictional force are constant, and the magnitude of the absolute value of said first frictional force and the magnitude of the absolute value of said second frictional force are asymmetrical at each angular position within the range of angles of rotation.

5. A tensioner according to claim 4, wherein the range of rotation is the range between a third rotation position located between said first rotation position and said second rotation position and a fourth rotation position located between said third rotation position and said second rotation position.

6. A tensioner according to claim 5, wherein, when said arm rotates from said first rotation position to said third rotation position in said second direction, a third damping force increased in proportion to the angle of rotation of said arm acts upon said arm.

7. A tensioner according to claim 1, wherein said first coil spring is shaped from a wire having a rectangular cross-section.

8. A tensioner according to claim 1, wherein said first and second bosses are respectively provided with first and second cylindrical surfaces with axial centers coaxial to a shaft of said arm.

9. A tensioner according to claim 8, wherein said at least one sleeve comprises a first sleeve provided between said first cylindrical surface and said first coil spring and having an axial center aligned with said shaft of said arm and a second sleeve provided between said second cylindrical surface and said first coil spring and having an axial center aligned with said shaft of said arm.

10. A tensioner according to claim 9, wherein said first and second sleeves are each provided with said at least one axial slit parallel to said shaft of said arm.

11. A tensioner according to claim 9, wherein said first and second sleeves are shaped from one of a resin mainly comprised of a polyether sulfone, a plastic containing at least nylon, and an alloy used for an oil-filled bearing.

12. A tensioner according to claim 10, wherein said first and second cylindrical surfaces are outer surfaces of said first and second bosses, respectively.

13. A tensioner according to claim 12, wherein said first coil spring is tightly fixed to one of said first cylindrical surface and an outer circumferential surface of said first sleeve and one of said second cylindrical surface and an outer circumferential surface of said second sleeve, whereby one of said first boss and said first sleeve and one of said second boss and said second sleeve are connected.

14. A tensioner according to claim 13, wherein at least one turn of said first coil spring is tightly fixed on one of said first cylindrical surface and said outer circumferential surface of said first sleeve and at least one turn is tightly fixed on one of said second cylindrical surface and said outer circumferential surface of said second sleeve.

15. A tensioner according to claim 13, wherein said first coil spring is coiled with a first curvature, and a radius of one of said first cylindrical surface and said outer circumferential surface of said first sleeve and a radius of one of said second cylindrical surface and said outer circumferential surface of said second sleeve have substantially the same length as said radius of said first coil spring.

16. A tensioner according to claim 15, wherein each of the two ends of said first coil spring exhibits an arc shape having a second curvature, which is the same as said first curvature.

17. A tensioner according to claim 13, wherein one end of said first coil spring is engaged with an annular spring receiving seat formed on one of said first boss and a flange of said first sleeve, and the other end of said first coil spring is engaged with an annular spring receiving seat formed on one of said second boss and a flange of said second sleeve.

18. A tensioner according to claim 13, wherein said biasing member is a second coil spring wound around said shaft of said arm and the winding directions of said first coil spring and said second coil spring are the same winding direction.

19. A tensioner according to claim 10, wherein one of said first and second cylindrical surfaces is an inner surface of one of said first and second bosses.

20. A tensioner according to claim 19, wherein said biasing member is a second coil spring wound around said shaft of said arm, and the winding directions of said first coil spring and said second coil spring are opposite each other.

21. A tensioner comprising:

a first engaging portion and a second engaging portion that are coaxially arranged with each other;

an arm provided with a pulley that engages an endless belt, said arm rotating between a first rotation position and a second rotation position around said first and second engaging portions;

a biasing member that urges said arm in a first direction from said second rotation position toward said first rotation position so as to tension a belt via said pulley; and a damping member that includes a first coil spring having two end portions engaged with said first and second engaging portions, said damping member configured to generate a first damping force, which is a resistance against the rotation of said arm, and a second damping force larger than said first damping force so as to damp vibration of said belt;

said damping member further comprising at least one sleeve having at least one axially extending slit, said at least one sleeve provided between at least one of said first and second engaging portions and said first coil spring;

wherein said first damping force acts upon said arm when said arm rotates in said first direction, and said second damping force acts upon said arm when said arm rotates in a second direction, which is the reverse direction to said first direction; and wherein when said arm rotates from said first rotation position in said second direction, said first coil spring and said sleeve act as a coil spring clutch that brakes the rotation of said arm due to a frictional sliding movement at least one of between said first coil spring and said sleeve and between said sleeve and one of said first and second engaging portions.

22. A tensioner comprising:

a fixing member;

an arm;

a pulley rotatably provided on said arm such that said pulley engages an endless belt;

a biasing member that urges said pulley into resilient contact with said belt; and a spring clutch that rotatably engages said arm to said fixing member, said spring clutch including a coil spring operating in conjunction with said biasing member and configured to generate a first tightening force and a second tightening force larger than said first tightening force, and at least one of a first engaging member and a second engaging member engaged with said coil spring to produce a first rotational resistance corresponding to said first tightening force and a second rotational resistance corresponding to said second tightening force; wherein said spring clutch further comprising at least one sleeve having at least one axially extending slit, said at least one sleeve provided between at least one of said first and second engaging members and said coil spring;

said first rotational resistance occurs in a first rotational direction of said arm, and said second rotational resistance occurs in a second rotational direction opposite said first rotational direction, said first and second rotational resistances permitting rotation of said arm in both said first and second rotational directions; and wherein when said arm rotates from said first rotation position in said second direction, said coil spring and said sleeve act as a coil spring clutch that brakes the rotation of said arm due to a frictional sliding movement at least one of between said first coil spring and said sleeve and between said sleeve and one of said first and second engaging members.

23. A tensioner comprising:

a pulley that resiliently contacts an endless belt;

an arm that rotatably engages said pulley on a first rotational axis;

a biasing member that urges said arm in a first direction so that said pulley tensions said belt;

a fixing member that rotatably engages said arm on a second rotational axis parallel to said first rotational axis; and a spring clutch that rotatably connects said arm and said fixing member, said spring clutch operating in conjunction with said biasing member and configured to generate a first rotational resistance in said first direction and a second rotational resistance larger than said first rotational resistance in a second direction opposite said first direction while permitting rotation in both said first and second directions;

said spring clutch member further comprising at least one sleeve having at least one axially extending slit, said at least one sleeve provided between at least one of said arm and said fixing member and a spring; and wherein when said arm rotates from said first rotation position in said second direction, said spring and said sleeve act as a spring clutch that brakes the rotation of said arm due to a frictional sliding movement at least one of between said spring and said sleeve and between said sleeve and one of said arm and said fixing member.

* * * * *